Feb. 17, 1959  E. WAINER  2,874,102
ELECTRODES AND METHODS OF MAKING SAME
Filed Aug. 12, 1953

INVENTOR.
EUGENE WAINER
BY
ATTORNEY

United States Patent Office 2,874,102
Patented Feb. 17, 1959

2,874,102

ELECTRODES AND METHODS OF MAKING SAME

Eugene Wainer, Cleveland Heights, Ohio, assignor to Radio Corporation of America, a corporation of Delaware Application August 12, 1953, Serial No. 373,751

3 Claims. (Cl. 204—42)

This invention relates to electrolytic cells such as capacitors and more particularly to novel electrodes comprising titanium dioxide for use in such cells and to methods of making them.

Many commercial electrolytic capacitors include an aluminum electrode bearing a relatively thin coating of aluminum oxide. The dielectric constant of aluminum oxide is only about 12. However, relatively high ratios of capacity to size are realized in capacitors utilizing aluminum because of the extreme thinness of the aluminum oxide film. It is believed that such films are about $10^{-5}$ to $10^{-4}$ cm. thick.

Titanium dioxide occurs in three principal crystalline forms: anatase, brookite and rutile. Anatase, also known as octahedrite, has a tetragonal structure with an octahedral habit. Brookite has an orthorhombic structure and is relatively rare. Rutile, the most stable form, has a tetragonal structure with a prismatic habit.

The relatively high dielectric constants of titanium dioxide in its various forms are well known: 30 for anatase, 78 for brookite and 112 for rutile. Thus a film of titanium dioxide having a thickness comparable to the thickness of an aluminum oxide film will provide an improvement in capacity of about 2½ to 10 times that of present commercial capacitors having the same electrode area. It is known to make titanium dioxide in all its forms but it has proven difficult to make thin continuous films of titanium dioxide.

Accordingly it is an object of the instant invention to provide novel methods of making thin, continuous, adherent, oxide films on titanium surfaces.

Another object is to provide novel electrodes for use in electrolytic cells.

Another object is to provide an improved electrolytic cell.

Another object is to provide novel methods of making electrodes suitable for use in electroyltic cells.

A further object is to provide improved electrodes comprising titanium dioxide for use in electrolytic cells.

A still further object is to provide novel electrolytic electrodes comprising titanium dioxide.

It has now been found that relatively thin, continuous, and adherent oxide films may be formed upon a titanium surface. An important feature of the invention includes electrolyzing a titanium surface successively in a series of acids to form a continuous film of anatase upon the surface, and subsequently utilizing the surface as an electrode in an electrolytic cell.

The invention may be more easily understood by reference to the following detailed description and to the drawing of which:

Similar reference characters have been applied to similar elements throughout the drawing.

Figure 1:
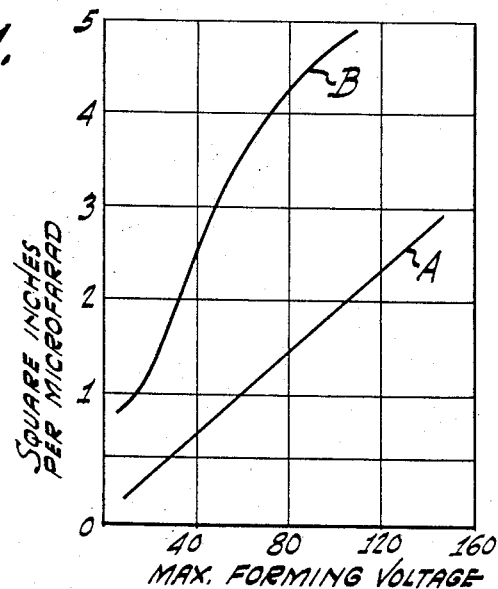
Figure 1 shows two curves illustrating an improvement provided by the instant invention.

According to a preferred embodiment of the invention a titanium surface is cleaned and then etched for about one minute in a 5% hydrofluoric acid solution. Hydrofluoric acid polishes the surface and removes impurities therefrom including any oxides of titanium. The surface is then electrolyzed in a solution comprising the proportions of about 100 ml. ethylene glycol, 100 ml. water and 10 gm. phosphoric acid. The titanium is made the anode and a D. C. voltage is applied sufficient to induce a current of up to about 200 ma. per square inch of surface area. This current density is not critical as to its lower limit, but should not be substantially more than about 200 ma. per square inch. Higher current densities adversely affect the adherence of the anatase film to the surface.

As the electrolysis progresses, a film of anatase is built up on the titanium. The anatase film increases the effective electrical resistance of the cell. The current flow is maintained at about 200 ma. per square inch by increasing the voltage across the cell until the voltage reaches a desired maximum value. The desired value will depend upon the eventual use to which the electrode is to be put and should be at least as great as the peak voltage to be applied to the electrode when it is employed in a circuit. When this voltage is reached it is maintained constant and the current is allowed to decrease to a value of about 4 to 8 ma. per square inch.

The electrolyte is replaced by a relatively mild oxidizing acid such as a 10% boric acid solution in water. The maximum voltage is again applied to the cell and maintained until the current has decreased to about 1 ma. per sq. inch or less. This step completes the forming of an anatase film upon the titanium surface.

The composition of the initial forming electrolyte may be varied within relatively wide limits, although it is believed that optimum results are provided by the solution described heretofore. In general, any oxidizing acid such as sulfuric acid will provide an anatase film on titanium; however, it has been found that phosphoric acid provides an anatase film having a relatively high degree of continuity and good adherence. The solution according to the invention also operates at a relatively high speed thus making the process economically practicable. A somewhat slower build-up of an anatase film is provided by less concenerated solutions, that is, solutions comprising a smaller proportion of phosphoric acid. Satisfactory results, however, may be obtained when utilizing an electrolyte comprising any proportions of ethylene glycol and water and about 1.0% to 15.0% by weight phosphoric acid.

The surface is suitable for use as an anode in an electrolytic cell utilizing any mild acid or alkaline electrolyte. An electrolyte such as boric acid dissolved in water, ethylene glycol or glycerine is suitable. Sodium hydroxide or ammonium hydroxide in water or glycerine also give satisfactory results. The electrolyte may be in any convenient form, either dry, semi-dry or wet as desired.

The properties of capacitors utilizing electrodes according to the instant invention are dependent upon the maximum voltage employed in the forming process. The effective capacity per unit electrode area is dependent on the thickness of the dielectric film, which in this case is anatase. A relatively high maximum voltage provides a relatively thick film of anatase, and a relatively low voltage provides a relatively thin film. The relationship is illustrated by curve A in Figure 1 which plots the ratio of the area of an electrode according to the invention to the capacity of a capacitor utilizing the electrode (area-capacity ratio) as a function of the maximum forming voltage. This curve is essentially a straight line. It will be seen that there exists a direct proportion between the maximum forming voltage and the area-capacity ratio. A relatively low maximum forming voltage provides an electrode having a relatively low ratio and, conversely, a relatively high maximum forming voltage provides an electrode having a relatively high ratio.

For purposes of comparison there is also shown a standard curve relating to aluminum electrodes. This curve, B of Figure 1, shows the area-to-capacity ratio as a function of maximum forming voltage for capacitors utilizing aluminum-aluminum oxide electrodes. Capacitors utilizing titanium-anatase electrodes according to the instant invention have a ratio of electrode area to capacity about one third as great as the ratio for capacitors utilizing aluminum electrodes. Thus, capacitors utilizing electrodes according to the invention can be made substantially smaller than capacitors utilizing aluminum electrodes and having the same electrical rating.

Figure 2:
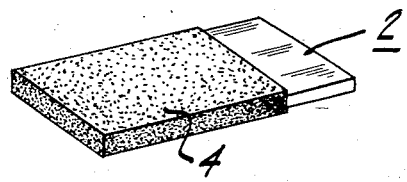
Figure 2 is a schematic, perspective view of an electrode formed according to the instant invention.

An electrode produced according to the invention is illustrated in Figure 2 which shows a titanium sheet 2 coated with a layer of anatase. Such an electrode may be conveniently utilized in a capacitor as shown in Figure 3.

Figure 3:
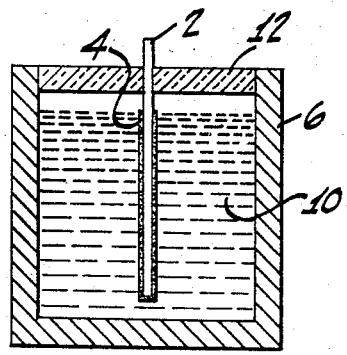
Figure 3 is a schematic, cross-sectional, elevational view of an eletrolytic cell utilizing an electrode similar to that shown in Figure 2.

Figure 3 shows a conventional wet type cell comprising a metallic container 6 which may be, for example, of copper or zinc. In the container is an electrolyte 10 such as a 2% to 3% solution of sodium hydroxide. An electrode 2 of titanium bearing a film 4 of anatase upon its surface is immersed in the electroylte and supported by an insulating lid 12 that covers and seals the container. The electrode projects through the lid to facilitate making an electrical contact to it. The container may be utilized as the second electrode of the device.

Many expedients have been previously described to increase the effective surface area of aluminum electrodes for use in capacitors. Such devices as roughening the surface by sandblasting or etching, spraying the metal upon a porous support such as gauze, and forming an electrode of compressed metallic powder have all been utilized. All of these methods and others are similarly effective to increase the surface area of a titanium electrode. The comparisons herein given between electrodes produced according to the instant invention and previous electrodes of aluminum are based upon a continuous flat electrode surface both for aluminum and titanium. It will therefore be seen that when the advantages of the instant invention are compounded with the advantages derived from these surface area multiplying expedients, electric capacitors having an improved ratio of size to capacity are provided.

Electrodes produced according to the instant invention have a relatively high ratio of capacity to physical size, that is to say, a relatively small capacitor utilizing a titanium-anatase electrode exhibits a relatively high electrical capacity.

What is claimed is:

1. A method of making an electrolytic electrode comprising the steps of anodically electrolyzing a titanium surface in a solution consisting essentially of substantially equal proportions of ethylene glycol and water, and including therein 1–15% phosphoric acid by weight, and subsequently electrolyzing said surface in a solution consisting essentially of about 10% by weight of boric acid and about 90% by weight of water, thereby to produce a film of anatase upon said surface.

2. The method according to claim 1 in which said solution of ethylene glycol, water and phosphoric acid consists essentially of the proportions of 100 ml. ethylene glycol, 100 ml. water and 10 gm. phosphoric acid, and said electrolyzing is carried out at a maximum of 200 ma. per sq. inch of area of said surface.

3. The product of the process of claim 1.

References Cited in the file of this patent

UNITED STATES PATENTS

| 1,925,307 | De Boer et al. | Sept. 5, 1933 |
| 1,985,118 | Van Geel et al. | Dec. 18, 1934 |
| 2,079,516 | Lilienfeld | May 4, 1937 |
| 2,174,841 | Robinson | Oct. 3, 1939 |
| 2,504,178 | Burnham et al. | Apr. 18, 1950 |

OTHER REFERENCES

"Handbook of Titanium Metal," 7th Edition (1953), Titanium Metals Corp., page 93.